(12) United States Patent
Zhao et al.

(10) Patent No.: US 8,274,982 B2
(45) Date of Patent: Sep. 25, 2012

(54) METHOD FOR PACKET DATA SESSION RELEASE IN ULTRA MOBILE BROADBAND ACCESS NETWORK

(75) Inventors: Xiaowu Zhao, Guangdong (CN); Kexue Lu, Guangdong (CN); Yuanfang Yu, Guangdong (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 219 days.

(21) Appl. No.: 12/678,749

(22) PCT Filed: Mar. 26, 2008

(86) PCT No.: PCT/CN2008/000604
§ 371 (c)(1),
(2), (4) Date: Mar. 18, 2010

(87) PCT Pub. No.: WO2009/036647
PCT Pub. Date: Mar. 26, 2009

(65) Prior Publication Data
US 2010/0232377 A1    Sep. 16, 2010

(30) Foreign Application Priority Data
Sep. 18, 2007   (CN) .......................... 2007 1 0153028

(51) Int. Cl.
*H04L 12/28* (2006.01)

(52) U.S. Cl. .................................... 370/395.2
(58) Field of Classification Search .................. None
See application file for complete search history.

(56) References Cited

U.S. PATENT DOCUMENTS

2007/0268908 A1* 11/2007 Linkola et al. ............. 370/395.2
2009/0043901 A1*  2/2009 Mizikovsky et al. ......... 709/229
2009/0046577 A1*  2/2009 Marin ........................... 370/219

* cited by examiner

*Primary Examiner* — Raj Jain
(74) *Attorney, Agent, or Firm* — PatentVentures; Bennett Smith; Korbin Van Dyke

(57) ABSTRACT

A packet data session release method for ultra mobile broadband access network is disclosed, and which includes: S402, when releasing the packet data session, an access gateway sends a proxy mobile IP registration revocation message to the data attachment point of the ultra mobile broadband access network and the evolved base station which has one reverse proxy mobile IP tunnel to the access gateway, respectively; S404, after receiving the proxy mobile IP registration revocation message, the data attachment point and the evolved base station which has one reverse proxy mobile IP tunnel to the access gateway, delete their proxy mobile IP tunnels between them and the access gateway, respectively, and send a proxy mobile IP revocation ACK message to the access gateway, respectively, so as to confirm the reception of the registration request messages; and S406, the data attachment point notifies the session reference network controller that the packet data session has been released, via sending a IP tunnel notification message to the session reference network controller.

18 Claims, 5 Drawing Sheets

METHOD FOR PACKET DATA SESSION RELEASE IN ULTRA MOBILE BROADBAND ACCESS NETWORK

FIELD OF THE INVENTION

The present invention relates to communication field, in particular to a method for Packet Data Session Release in ultra mobile broadband access network.

BACKGROUND OF THE INVENTION

The Ultra Mobile Broadband (UMB) session release operation resulted from packet data session release in the UMB access network comprises the procedure as shown in FIG. 1. For an Access Terminal (AT) in an active status, when an Access Gateway (AGW) releases packet data session, it sends a Proxy Mobile IP (PMIP) registration revocation message to a Data Attachment Point (DAP) which notifies a Session Reference Network Controller (SRNC) that the packet data session has been released. This may cause the SRNC to decide to release the air interface session with the AT. After releasing the air interface session, the SRNC sends a single session release message to notify all the Evolved Base Stations (eBSs) in the route set that the session has been released. The eBSs send confirmation messages to confirm the reception of the session release message. In this releasing procedure, it is assumed that there is a PMIP tunnel only between the DAP and the AGW. But in fact, any eBS in the route set of the AT in the access network may have one reverse PMIP tunnel to the AGW. Therefore, the case of multiple PMIP tunnels should be considered in the UMB session release procedure resulted from the packet data session release, to improve the procedure of the session release.

It is noted that in the UMB, each AT has one route set, the members of the route set are a set of access route instances, because there is a route instance between each SRNC or eBS and an AT respectively. Therefore, the route set members of the AT are SRNC and eBS.

SUMMARY OF THE INVENTION

In view of the above mentioned one or more problems, the present invention provides a UMB session release method for activating an AT.

A packet data session release method for UMB access network according to an embodiment of the present invention comprises the following steps: S202, when releasing the packet data session, an AGW sends a PMIP registration revocation message to the data attachment point of the UMB access network; S204, after receiving the PMIP registration revocation message, the data attachment point sends a PMIP revocation ACK message to the AGW to confirm the reception of the PMIP registration revocation message; S206, the data attachment point sends an IP tunnel notification message to the SRNC to notify the SRNC that the packet data session has been released; S208, after receiving the IP tunnel notification message, the SRNC sends an IP tunnel notification ACK message to confirm that the SRNC has received the IP tunnel notification message, triggers the UMB session release, and sends the session release message to the route set members of the AT and the data attachment point; S210, after receiving the session release message, the route set members and the data attachment point send the session release ACK message to confirm that they have received the session release message respectively; S212, the forward/reverse eBS of the route set members sends an accounting request message to the AGW; and S214, the AGW returns an accounting response message to the forward/reverse eBS after receiving the accounting request message.

Wherein, in Step S206, if the data attachment point also is a member in the route set of the AT, then the data attachment point also sends the IP tunnel notification releasing message to the other route set members of the AT, and receives IP tunnel notification confirmation messages returned from the other route set members of the AT. The non-data-attachment-point of the route set members which have one reverse PMIP tunnel to the AGW automatically release the reverse PMIP tunnels after receiving the session release message.

Wherein, the AGW starts a first timer with specific time length, while sending a PMIP registration revocation message to the data attachment point, so that if the AGW does not receive the PMIP registration revocation ACK message within the specific time length, the AGW resends the PMIP registration revocation message to the data attachment point; the data attachment point starts a second timer with specific time length while sending a IP tunnel notification message to the SRNC and/or forward/reverse eBS, so that if the data attachment point does not receive IP tunnel notification response messages from the SRNC and/or forward/reverse eBS within the specific time length, the data attachment point resends a IP tunnel notification message to the SRNC and/or forward/reverse eBS; the forward/reverse eBS in the route set of the above mentioned starts a third timer with specific time length, while sending the accounting request message to the AGW, so as to resends the accounting request message to the AGW in case of the accounting response message from the AGW not being received in the specific time length.

Another packet data session release method for UMB access network according to an embodiment of the present invention comprises the following steps: S402, when releasing the packet data session, an AGW sends a PMIP registration revocation message to a data attachment point of the UMB access network and an eBS which has one reverse proxy mobile IP tunnel to the AGW respectively; S404, after receiving the PMIP registration revocation message, the data attachment point and the eBS which has one reverse proxy mobile IP tunnel to the AGW delete their PMIP tunnels between them and the AGW, respectively, and send a PMIP registration revocation ACK message to the AGW, respectively, so as to confirm that the data attachment point and the eBS which has one reverse proxy mobile IP tunnel to the AGW have received the PMIP registration request message; and S406, the data attachment point sends a IP tunnel notification message to the SRNC, so as to notify the SRNC that the packet data session has been released.

The SRNC may release the UMB session or not, after acquiring that the packet data session has been released from the received IP tunnel notification message. wherein, the AGW starts a first timer with a specific time length, while sending a PMIP registration revocation message to the data attachment point and the eBS which has one reverse proxy mobile IP tunnel to the AGW, so as to resend the PMIP registration revocation message to the data attachment point and the eBS which has one reverse proxy mobile IP tunnel to the AGW in case that PMIP registration revocation ACK messages have not been received within the specific time length The data attachment point starts a second timer with a specific time length, while sending a IP tunnel notification message to the SRNC, so as to resend the IP tunnel notification message to the SRNC if a response message from the SRNC has not been received within the prescribed time length.

The present invention improves the session release function of the access network supporting the UMB technology, and thus improves the function of the whole network.

BRIEF DESCRIPTION OF THE DRAWINGS

The drawings are provided for a further understanding of the present invention and form a part of the specification, which are used to explain the present invention with the embodiments of the present invention rather than to unduly limit the present invention, wherein.

DETAILED DESCRIPTION OF THE EMBODIMENTS

The concrete embodiments of the present invention will be described in detail with reference to the drawings.

Figure 1:
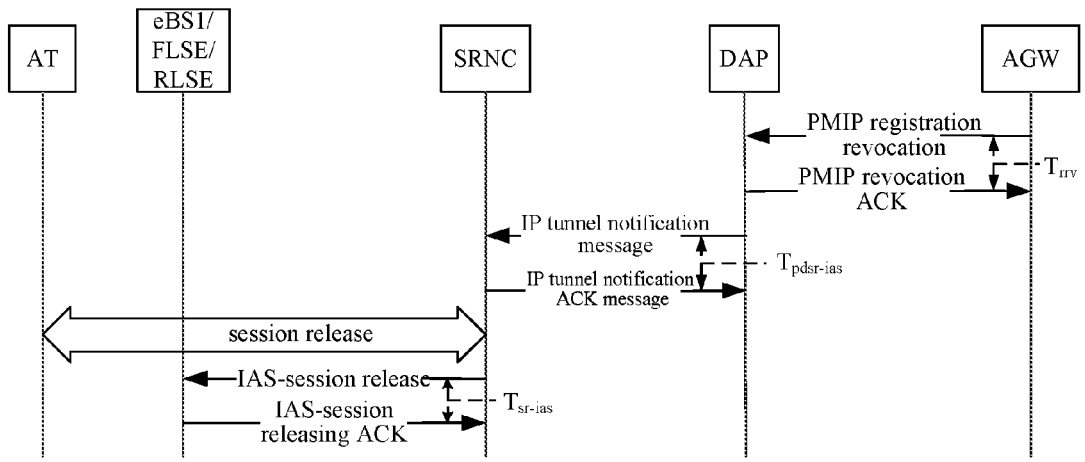
FIG. 1 is the flow chart of the UMB session release process in the art.
Figure 2:
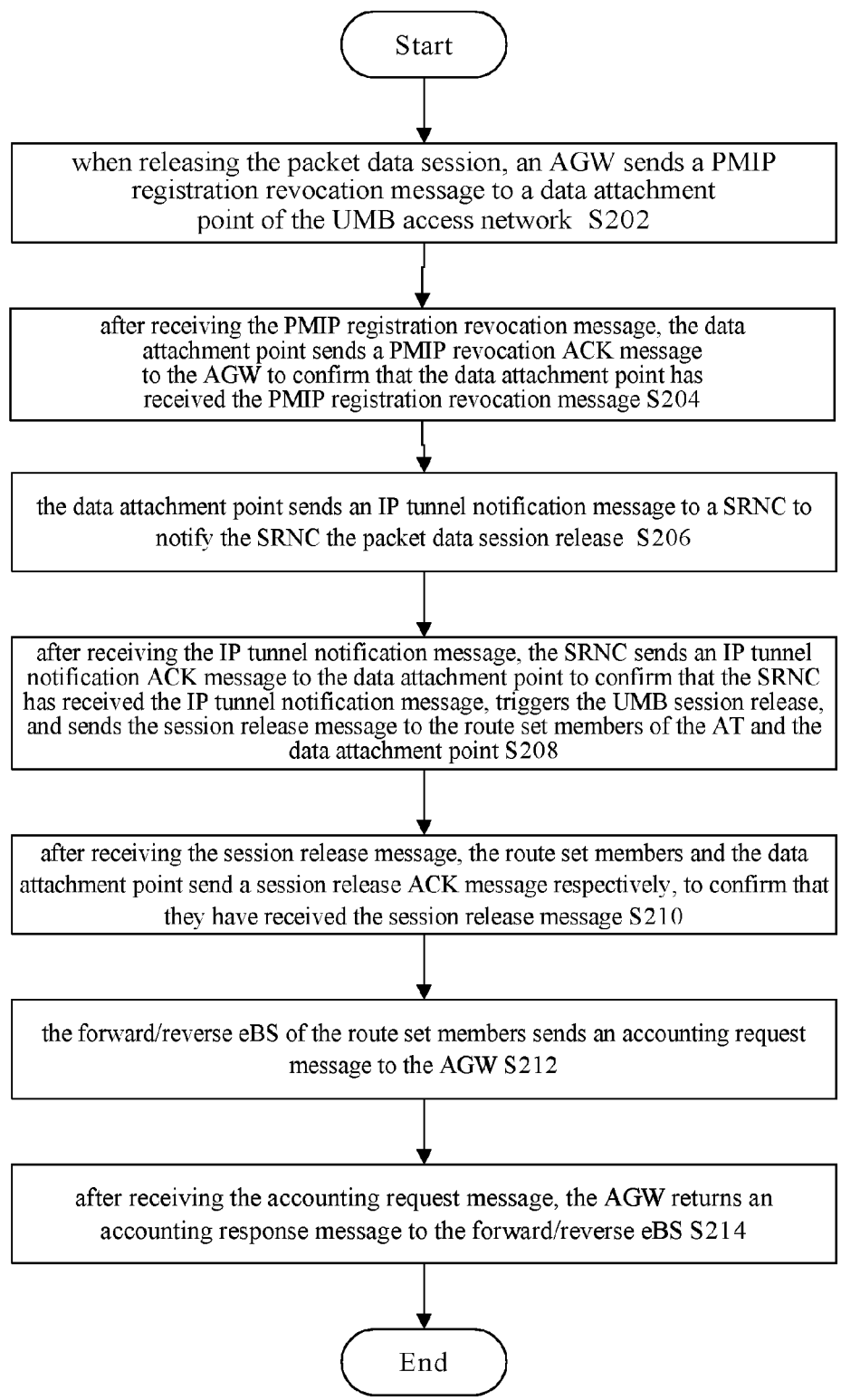
FIG. 2 is a flow chart of packet data session release process for the UMB access gateway according to one embodiment of the present invention.

Referring to FIG. 2, the following description explains the flow chart of the packet data session release process of the UMB access gateway according to one embodiment of the present invention. As shown in FIG. 2, the session release process comprises the following steps, S202, when releasing the packet data session, an AGW sends a PMIP registration revocation message to a data attachment point of the UMB access network; S204, after receiving the PMIP registration revocation message, the data attachment point sends a PMIP revocation ACK message to the AGW to confirm the reception of the PMIP registration revocation message; S206, the data attachment point sends an IP tunnel notification message to the SRNC to notify the SRNC that the packet data session has been released; S208, after receiving the IP tunnel notification message, the SRNC sends an IP tunnel notification ACK message to confirm the reception of the IP tunnel notification message, triggers the UMB session release, and sends a session release message to the route set members of the AT and the data attachment point; S210, after receiving the session release message, the route set members and the data attachment point send session release ACK messages respectively to the SRNC to confirm that they have received the session release message; S212, the forward/reverse eBS of the route set members sends an accounting request message to the AGW; and S214, the AGW returns an accounting response message to the forward/reverse eBS after receiving the accounting request message.

Wherein, in Step S206, if the data attachment point is also a member in the route set of the AT, the data attachment point sends an IP tunnel notification release message to the other route set members of the AT, and receives IP tunnel notification ACK messages returned from the other route set members of the AT. The non-data-attachment-point of the route set members which has one reverse PMIP tunnel to the AGW, automatically releases the reverse PMIP tunnel after receiving the session release message.

Wherein, the AGW starts a first timer with a specific time length, while sending a PMIP registration revocation message to the data attachment point, so that if the AGW does not receive a PMIP registration revocation ACK message within the specific time length, resend the PMIP registration revocation message to the data attachment point; the data attachment point starts a second timer with a specific time length, while sending an IP tunnel notification message to the SRNC and/or forward/reverse eBS, so as to resend the IP tunnel notification message to the SRNC and/or forward/reverse eBS in case that the data attachment point does not receive an IP tunnel notification response message from the SRNC and/or forward/reverse eBS within the specific time length; the forward/reverse eBS starts a third timer with a specific time length, while sending an accounting request message to the AGW, so as to resend the accounting request message to the AGW in case that the forward/reverse eBS does not receive an accounting response message from the AGW within the specific time length.

Figure 3:
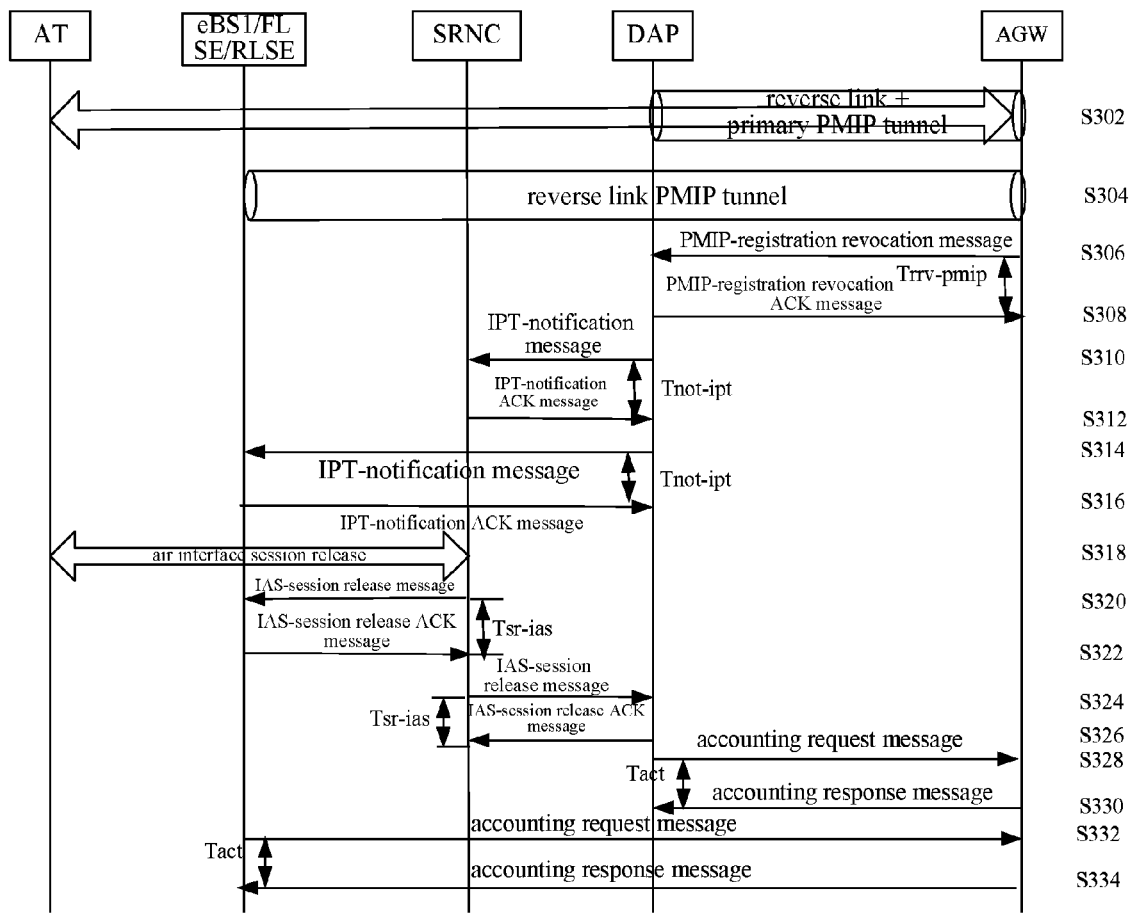
FIG. 3 is a flow chart of the UMB session release process resulted from packet data session release when there are a plurality of PMIP tunnels, which contains the process of FIG. 2.

Referring to FIG. 3, the following description explains the flow chart of the UMB session release process resulted from the packet data session release when there are multiple PMIP tunnels, which contains the process of FIG. 2. Wherein, apart from a reverse PMIP tunnel between the DAP and the AGW, there is also one reverse PMIP tunnel between the eBS1 (which may be a Reverse Link Serving eBS (RLSE), or a non-RLSE) and the AGW, wherein, it is assumed that the eBS is the forward reverse serving eBS or forward serving eBS in this embodiment. As shown in FIG. 3, the session release process comprises the following steps:

S302, there is a primary PMIP tunnel between the DAP and the AGW, i.e., the forward and reverse PMIP tunnels, and data are being transmitted between the AT and the AGW.

S304, there is a reverse PMIP tunnel between eBS1/FLSE/RLSE and the AGW for transmitting reverse data.

S306, the AGW sends a PMIP registration revocation message to the DAP and sets a timer Trrv-pmip.

S308, after receiving the PMIP-registration revocation message, the DAP sends a PMIP-revocation ACK message to the AGW which stops the timer Trrv-pmip.

S310, the DAP sends an IP tunneling (IPT)-notification message to the SRNC to indicate that the packet data session has been released, and sets a timer Tpdsr-ipt.

S312, after receiving the IPT-notification message, the SRNC sends an IPT-notification ACK message to the DAP, which stops the timer Tpdsr-ipt after receiving the ACK message.

S314, if the DAP is in the route set of the AT, the DAP sends the IPT-notification message to the SRNC to indicate that the packet data session has been released, and sets the timer Tpdsr-ipt.

S316, after receiving the IPT-notification message, the SRNC sends an IPT-notification ACK message to the DAP which stops the timer Tpdsr-ipt after receiving the ACK message.

S318, after receiving the IPT-notification message, the SRNC may decide to initiate the UMB session release.

After releasing the UMB session between the AT and the SRNC, the SRNC sends an IAS-session release message to all Access Network Route Instance (ANRI) in its route set and the DAP.

S320, the SRNC sends the IAS-session release message to eBS1/FLSE/RLSE, and sets a timer Tsr-ias.

S322, after receiving the IAS-session release message, eBS1/FLSE/RLSE sends the IAS-session release ACK messages to the SRNC, which stops the timer Tsr-ias after receiving the confirmation message.

S324, the SRNC sends the IAS-session release message to the DAP, and sets a timer Tsr-ias.

S326, after receiving the IAS-session release message, the DAP sends an IAS-session release ACK message to the SRNC, which stops the timer Tsr-ias after receiving the ACK message.

S328, if the DAP has previously created an air link record for the AT, then the DAP sends an accounting requesting (interim) message to the AGW, and starts a timer Tact. This step could be performed after Step S310.

S330, the AGW sends an accounting response message to the DAP which stops the timer Tact after receiving the accounting response message.

S332, eBS1/FLSE/RLSE sends an accounting request message to the AGW, and starts the timer Tact. This step could be performed after Step S316.

S334, the AGW sends an accounting response message to the eBS1/FLSE/RLSE, which stops the timer Tact after receiving the response message.

Figure 4:
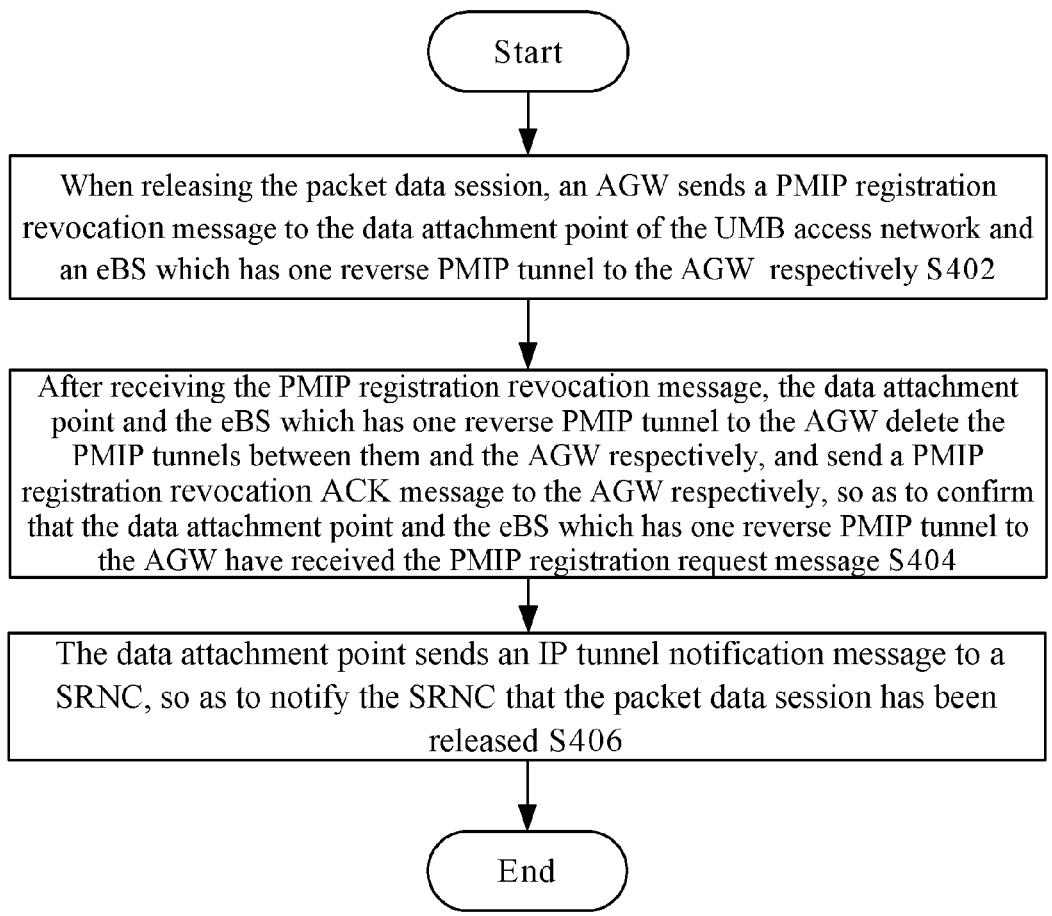
FIG. 4 is a flow chart of packet data session release process for the UMB access network according to another embodiment of the present invention.

Referring to Fig.4, the following description explains the flow chart of packet data session release process of the UMB access gateway according to another embodiment of the present invention. As shown in Fig.4, the session release process comprises the following steps: S402, when releasing the packet data session, an AGW sends a PMIP registration revocation message to a data attachment point of the UMB access network and an eBS which has one reverse PMIP tunnel to the AGW; S404, after receiving the PMIP registration revocation message, the data attachment point and the eBS which has one reverse PMIP tunnel to the AGW delete the PMIP tunnels between them and the AGW respectively, and send a PMIP registration revocation ACK message to the AGW respectively so as to confirm the reception of the PMIP registration revocation message; and S406, the data attachment point sends an IP tunnel notification message to the SRNC, so as to notify the SRNC that the packet data session has been released.

Wherein, after receiving the IP tunnel notification message and then acquiring that the packet data session has been released, the SRNC may release the UMB session or not. Wherein, the AGW starts a first timer with a specific time length, while sending a PMIP registration revocation message to the data attachment point and the eBS which has one reverse PMIP tunnel to the AGW, so as to resend the PMIP registration revocation message to the data attachment point or the eBS which has one reverse PMIP tunnel to the AGW in case that the AGW does not receive the PMIP registration revocation ACK message within the specific time length. The data attachment point starts a second timer with a specific time length, while sending an IP tunnel notification message to the SRNC, so as to resend the IP tunnel notification message to the SRNC in case that the data attachment point does not receive the response message from the SRNC within the specific time length.

Figure 5:
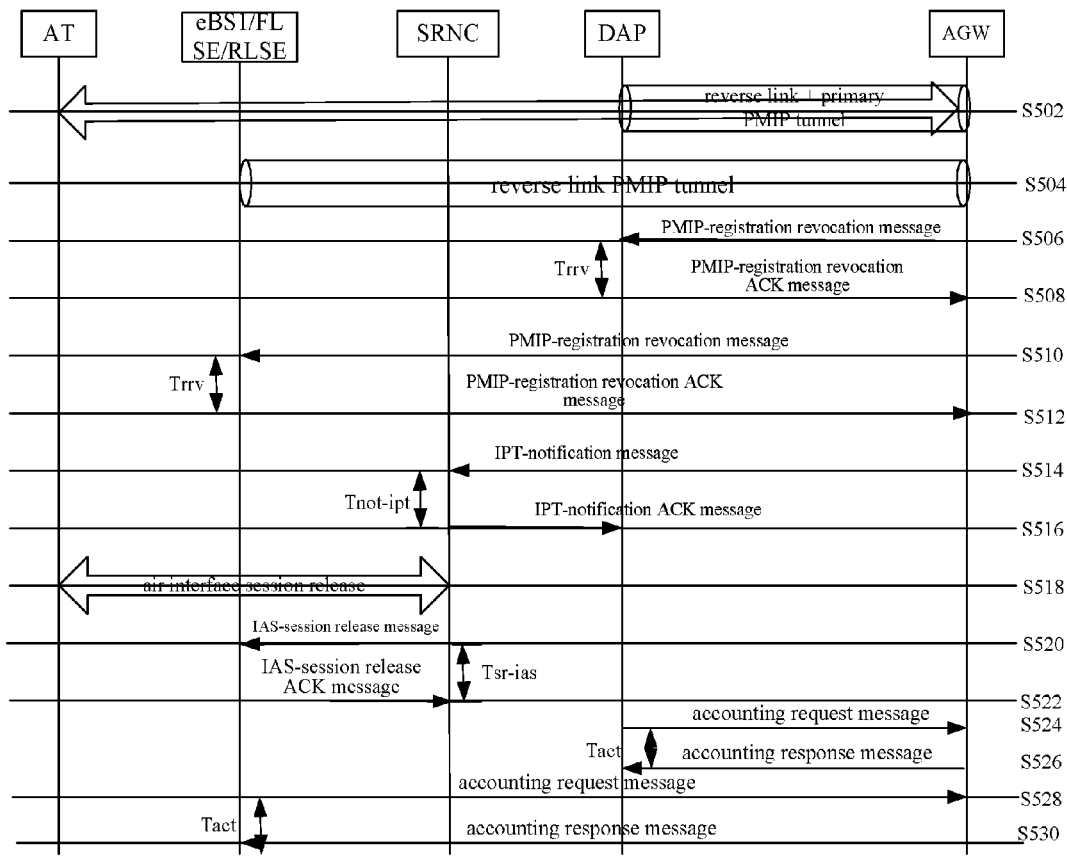
FIG. 5 is a flow chart of the UMB session release process initiated by the AGW and resulted from packet data session release when there are multiple PMIP tunnels, which contains the process of FIG. 4.

Referring to FIG. 5, the following description explains the flow chart of the UMB session releasing process initiated by the AGW resulted from packet data session releasing when there are multiple PMIP tunnels, which contains the process of FIG. 4. As shown in FIG. 5, the session releasing process comprises the following steps:

S502, there is forward reverse PMIP tunnel between the DAP and the AGW, and data are being transmitted between the AT and the AGW.

S504, there is a reverse PMIP tunnel between eBS1 and the AGW for transmitting reverse data.

S506, the AGW sends a PMIP-registration revocation message to the DAP, and sets a timer Trrv-pmip.

S508, after receiving the PMIP-registration revocation message, the DAP sends the PMIP-revocation ACK message to the AGW which stops the timer Trrv-pmip.

S510, the AGW sends the PMIP-registration revocation message to eBS1, and sets the timer Trrv-pmip.

S512, after receiving the PMIP-registration revocation message, eBS1 sends a PMIP-registration revocation ACK message to the AGW which stops the timer Trrv-pmip.

S514, the process assumes that the DAP is not in the route set of the AT. The DAP sends an IPT-notification message to the SRNC to indicate that the packet data session has been released, and sets a timer Tpdsr-ipt.

S516, after receiving the IPT-notification message, the SRNC sends an IPT-notification ACK message to the DAP, which stops the timer Tpdsr-ipt after receiving the ACK message.

S518, after receiving the IPT-notification message, the SRNC may decide to initiate UMB session release.

After releasing the session between the AT and the SRNC, the SRNC sends an IAS-session release message to all Access Network Route Instance (ANRI) in its route set.

S520, the SRNC sends the IAS-session release message to eBS1/FLSE/RLSE, and sets a timer Tsr-ias.

S522, after receiving the IAS-session release message, eBS1/FLSE/RLSE sends an IAS-session release ACK message to the SRNC, which stops the timer Tsr-ias after receiving the ACK message.

S524, if the DAP has previously created an air link record for the AT, the DAP sends an accounting request (interim) message to the AGW, and starts a timer Tact. This step can be performed at any time after Step S514.

S526, the AGW sends an accounting response message to the DAP, which stops the timer Tact after receiving the response message.

S528, eBS1/FLSE/RLSE sends an accounting request message to the AGW, and starts the timer Tact. This step can be performed any time after Step S520.

S530, the AGW sends an accounting response message to the eBS1/FLSE/RLSE which stops the timer Tact after receiving the response message.

Based on the above description, based on the fact that multiple PMIP tunnels are not under consideration in the UMB session release process resulted from packet data session release in the current UMB access network technology, the present invention puts forward a session release process for the case of multiple PMIP tunnels, so as to improve the session release process of the UMB access network technology.

The above description is to illustrate embodiments of the present invention, not to limit the present invention. Various alterations and changes to the present invention are apparent to those skilled in the art. The scope defined in claims shall comprise any modification, equivalent substitution and improvement within the spirit and principle of the present invention.

What is claimed is:

1. A method for packet data session release in ultra mobile broadband (UMB) access network, comprising the following steps:

when releasing the packet data session, sending, by an access gateway (AGW), a proxy mobile IP (PMIP) registration revocation message to a data attachment point of the UMB access network;

after receiving the PMIP registration revocation message, sending, by the data attachment point, a PMIP revocation ACK message to the AGW to confirm the reception of the PMIP registration revocation 1 message;

sending, by the data attachment point, an IP tunnel notification message to a session reference network controller (SRNC) to notify the SRNC that the packet data session has been released;

performing, by the SRNC and after receiving the IP tunnel notification message, sending an IP tunnel notification ACK message to the data attachment point to confirm that the SRNC has received the IP tunnel notification message, triggering a UMB session release, and sending a session release message to the route set members of the AT and the data attachment point; and after receiving the session release message, sending, by the route set members and the data attachment point respectively, a session release ACK message to the SRNC to confirm that the route set members and the data attachment point have received the session release message.

2. The method for packet data session release of claim 1, further comprising the following steps:

sending, by a forward/reverse eBS of the route set members, an accounting request message to the AGW; and returning, by the AGW, an accounting response message to the forward/reverse eBS after receiving the accounting request message.

3. The method for packet data session release of claim 1, wherein if the data attachment point is also a member in route set, the data attachment point sends the IP tunnel notification release message to other route set members of the AT, and receives the IP tunnel notification ACK message from the other route set members of the AT.

4. The method for packet data session release of claim 3, wherein the AGW starts a first timer with a specific time length, while sending the PMIP registration revocation message to the data attachment point, so that if the AGW does not receive the PMIP registration revocation ACK message from the data attachment point within the specific time length, the AGW resends the data attachment point the PMIP registration revocation message.

5. The method for packet data session release of claim 4, wherein the data attachment point starts a second timer with a specific time length while sending the IP tunnel notification message to the SRNC and/or the forward/reverse eBS, so that if the data attachment point does not receive the IP tunnel notification ACK message from the forward/reverse eBS within the specific time length, the data attachment point resends the SRNC and/or the forward/reverse eBS the IP tunnel notification message.

6. The method for packet data session release of claim 5, wherein the forward/reverse eBS starts a third timer with a specific time length, while sending the accounting request message to the AGW, so that if the forward/reverse eBS does not receive the accounting response message from the AGW within the specific time length, the forward/reverse eBS resends the AGW the accounting request message.

7. The method for packet data session release of claim 1, further comprising the following step:

after receiving the session release message, automatically releasing the reverse PMIP tunnel by a non-data-attachment-point of the route set members which has a reverse PMIP tunnel to the AGW.

8. A method for packet data session release ultra mobile broadband UMB access network, comprising the following steps:

when releasing the packet data session, sending, by an access gateway AGW, a PMIP registration revocation message respectively to a data attachment point of the UMB access network and an eBS which has a reverse PMIP tunnel to the AGW;

performing, after receiving the PMIP registration revocation message, by the data attachment point and the eBS, deleting the PMIP tunnels between them and the AGW respectively, and sending a PMIP registration revocation acknowledge message to the AGW respectively, so as to confirm that they have received a PMIP registration revocation message; and informing, by the data attachment point, the SRNC that the packet data session has been released, through sending an IP tunnel notification message to the SRNC.

9. The method for packet data session release of claim 8, wherein the AGW starts a first timer in a specific time length, while sending the PMIP registration revocation message to the data attachment point and the eBS which has a reverse PMIP tunnel to the AGW, so that if the AGW does not receive the PMIP registration revocation ACK message within the specific time length, the AGW resends the PMIP registration revocation message to the data attachment point or the eBS which has a reverse PMIP tunnel to the AGW.

10. The method for packet data session release of claim 8, wherein the data attachment point starts a second timer in a specific time length, while sending the IP tunnel notification message to the SRNC, so that if the data attachment point does not receive a response message from the SRNC within the specific time length, the data attachment point resends the IP tunnel notification message to the SRNC.

11. The method for packet data session release of claim 10, wherein after receiving the IP tunnel notification message and then acquiring that the packet data session has been released, the SRNC decides to release the UMB session or not.

12. The method for packet data session release of claim 2, wherein if the data attachment point is also a member in route set, the data attachment point sends the IP tunnel notification release message to other route set members of the AT, and receives the IP tunnel notification ACK message from the other route set members of the AT.

13. The method for packet data session release of claim 12, wherein the AGW starts a first timer with a specific time length, while sending the PMIP registration revocation message to the data attachment point, so that if the AGW does not receive the PMIP registration revocation ACK message from the data attachment point within the specific time length, the AGW resends the data attachment point the PMIP registration revocation message.

14. The method for packet data session release of claim 13, wherein the data attachment point starts a second timer with a specific time length while sending the IP tunnel notification message to the SRNC and/or the forward/reverse eBS, so that if the data attachment point does not receive the IP tunnel notification ACK message from the forward/reverse eBS within the specific time length, the data attachment point resends the SRNC and/or the forward/reverse eBS the IP tunnel notification message.

15. The method for packet data session release of claim 14, wherein the forward/reverse eBS starts a third timer with a specific time length, while sending the accounting request message to the AGW, so that if the forward/reverse eBS does not receive the accounting response message from the AGW within the specific time length, the forward/reverse eBS resends the AGW the accounting request message.

16. The method for packet data session release of claim 2, further comprising the following step:

after receiving the session release message, automatically releasing the reverse PMIP tunnel by a non-data-attachment-point of the route set members which has a reverse PMIP tunnel to the AGW.

17. The method for packet data session release of claim 9, wherein the data attachment point starts a second timer in a specific time length, while sending the IP tunnel notification message to the SRNC, so that if the data attachment point does not receive a response message from the SRNC within the specific time length, the data attachment point resends the IP tunnel notification message to the SRNC.

18. The method for packet data session release of claim 17, wherein after receiving the IP tunnel notification message and then acquiring that the packet data session has been released, the SRNC decides to release the UMB session or not.

* * * * *